United States Patent
Wöls

(10) Patent No.: US 9,175,709 B2
(45) Date of Patent: Nov. 3, 2015

(54) DEVICE FOR DETECTING RELATIVE MOVEMENTS IN A VEHICLE

(75) Inventor: Kurt Wöls, Graz (AT)

(73) Assignee: Siemens AG Oesterreich, Vienna (AT)

( * ) Notice: Subject to any disclaimer, the term of this patent is extended or adjusted under 35 U.S.C. 154(b) by 52 days.

(21) Appl. No.: 14/008,687

(22) PCT Filed: Mar. 28, 2012

(86) PCT No.: PCT/EP2012/055503
§ 371 (c)(1),
(2), (4) Date: Sep. 30, 2013

(87) PCT Pub. No.: WO2012/139893
PCT Pub. Date: Oct. 18, 2012

(65) Prior Publication Data
US 2014/0079504 A1   Mar. 20, 2014

(30) Foreign Application Priority Data

Apr. 12, 2011 (AT) .................................. A 517/2011

(51) Int. Cl.
*G08B 13/14* (2006.01)
*F16B 31/02* (2006.01)
*F16B 39/10* (2006.01)
*G01M 17/10* (2006.01)
*F16B 33/00* (2006.01)

(52) U.S. Cl.
CPC ................. *F16B 31/02* (2013.01); *F16B 39/10* (2013.01); *G01M 17/10* (2013.01); *F16B 31/028* (2013.01); *F16B 33/002* (2013.01)

(58) Field of Classification Search
None
See application file for complete search history.

(56) References Cited

U.S. PATENT DOCUMENTS

| 7,412,898 | B1 | 8/2008 | Pothier | |
| 7,825,811 | B2 | 11/2010 | Chan et al. | |
| 8,400,270 | B2 * | 3/2013 | Brand | 340/10.1 |
| 2009/0207008 | A1 | 8/2009 | Calaman | |
| 2009/0231097 | A1 * | 9/2009 | Brand | 340/10.1 |

FOREIGN PATENT DOCUMENTS

| CN | 101370998 A | 2/2009 |
| CN | 101465043 A | 6/2009 |
| DE | 102005007194 A1 | 8/2006 |
| DE | 102006009898 A1 | 9/2007 |
| DE | 102007030195 A1 | 1/2009 |
| WO | 2009000919 A2 | 12/2008 |

* cited by examiner

*Primary Examiner* — Travis Hunnings
(74) *Attorney, Agent, or Firm* — Laurence A. Greenberg; Werner H. Stemer; Ralph E. Locher

(57) ABSTRACT

A device is provided for detecting relative movements in a component of a vehicle. The device includes an RFID transponder, which has a first part and a second part as well as a predetermined breaking point between the first part and the second part. The RFID transponder is attached such that relative movements and/or positional changes of this component lead to a fracture of the RFID transponder at the predetermined breaking point.

7 Claims, 1 Drawing Sheet

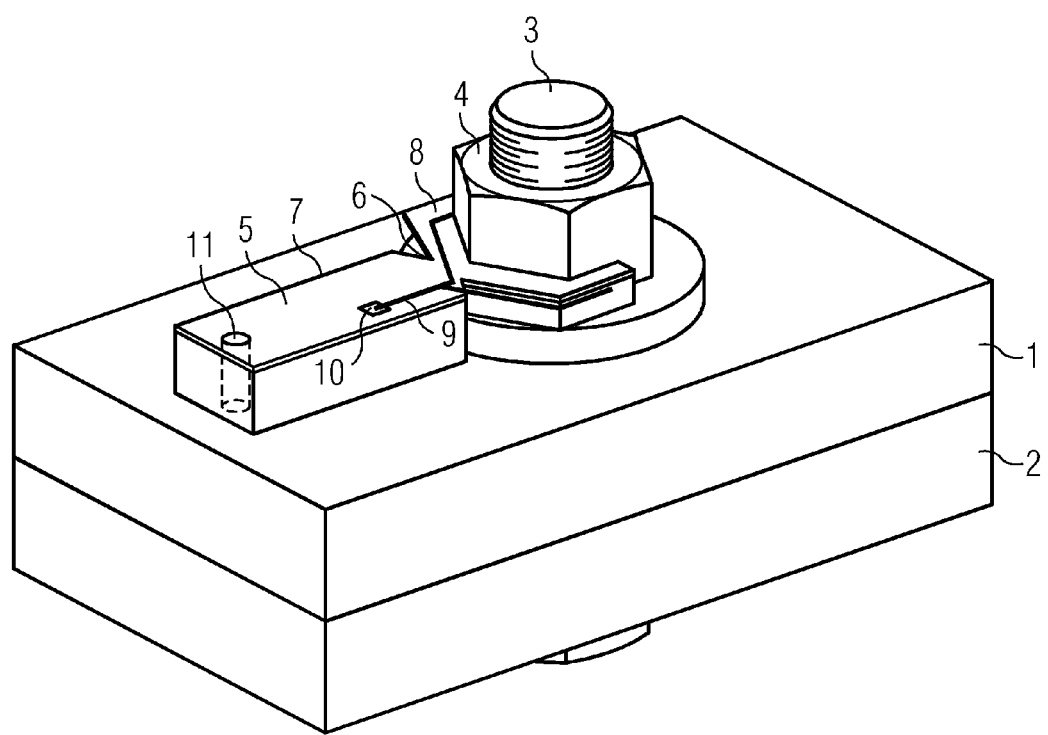

DEVICE FOR DETECTING RELATIVE MOVEMENTS IN A VEHICLE

CROSS REFERENCE TO RELATED APPLICATIONS

This application is the US National Stage of International Application No. PCT/EP2012/055503, filed Mar. 28, 2012 and claims the benefit thereof. The International Application claims the benefits of Austrian application No. A517/2011 AT filed Apr. 12, 2011. All of the applications are incorporated by reference herein in their entirety.

TECHNICAL FIELD

The invention relates to a device for detecting relative movements between or respectively of components of a vehicle, in particular in rail vehicles, trains, aircraft and/or running gear of rail vehicles, aircraft, etc.

PRIOR ART

In the evaluation of vehicles, in particular rail vehicles, but also of aircraft, safety, availability and maintenance-friendliness are usually considered as important criteria. Particularly in respect of the construction of high-performance or high-speed tracks in the railways field these characteristics are becoming ever more important for a vehicle. Since on such high-speed tracks speeds in the range of 200 to 400 km/h can be reached by a vehicle for example, it is important for the vehicle, especially its running gear, to function safely and correctly there.

Running gear here refers to a totality of all moving parts of a vehicle, through which a connection to the road or to the track is guaranteed. With a rail vehicle the running gear transfers forces occurring between track and vehicle and supports the vehicle in the track. Minor unevennesses in the track are also taken up by the running gear and are only passed on to the vehicle to a reduced extent, which improves passenger comfort. In such cases running gear of a rail vehicle, especially train running gear, usually comprises what are known as the wheel sets, the wheel set bearings and springing and thus consists of a number of different components which can be connected to one another via connection means, (e.g. screws, etc.).

If by way of example because of e.g. stress during operation, connections between vehicle components, especially in the area of the running gear, are loosened, positional changes of these components and/or relative movements between these individual components can occur. Relative movement means in such cases that a mostly undesired movement is performed by a first component in relation to a second component, to which said component is connected for example. Such relative movements as well as positional changes can thus lead to uncontrolled failures, reduced availability of the vehicle, etc., and above all represent a safety risk.

To guarantee the required safety of vehicles (e.g. rail vehicles, trains, aircraft, etc.) or to prevent accidents, regular checks on the vehicles, especially the connections between vehicle components or above all in the area of the running gear, as well as a program of preventive maintenance work is necessary. The running gear in particular is assigned a particular importance during these checks and work, as a result of the high safety demands on the one hand and the high maintenance costs compared to a whole train on the other hand. Measures for checking or maintaining the vehicle and above all the running gear are for example visual checks, running gear checks and/or so-called revisions, which are prescribed and carried out within the framework of maintenance plans at defined intervals.

In a visual check an optical and/or visual check of the vehicle or rail vehicle, especially of the running gear, can be carried out for example. In such cases for example mechanical damage, obvious wear, obvious positional changes of components, etc. can be established. Visual checks are mostly performed by trained maintenance personnel as a human activity and precisely for this reason are less efficient than automated checks. There is thus the danger of faults and/or defects being overlooked. With running gear checks for example, in addition to optical-visual checking, suitable test methods/systems can also be used in order to detect defects and/or to rectify faults on the running gear. A revision is a technical check which is prescribed and in which safety-relevant data of the rail vehicle or of the running gear is checked.

However with running gear—which assumes a particular safety-relevant significance—access to safety-relevant locations is more difficult and because of this the option of analysis and monitoring is restricted or associated with great effort. This means that testing and/or checking of a vehicle, especially the safety-relevant locations, such as connections between components for example, especially in the area of the running gear, are time-intensive and associated with great effort. Because of the restricted analysis option for example with visual and/or running gear checks, safety-relevant defects such as loosened screws or nuts for example, loose connections between components, which can lead to undesired relative movements and/or positional changes, etc. are only able to be detected with difficulty and often not in good time.

SUMMARY OF THE INVENTION

The underlying object of the invention is therefore to specify a device through which, without great effort and in a low-cost manner, increasing safety requirements for a vehicle can be fulfilled and defects and faults can be detected quickly and in good time and thus the availability of a vehicle can be increased.

In accordance with the invention the object is achieved by a device of the type mentioned at the start, in which for each component to be monitored or safety-relevant component of a vehicle, especially a rail vehicle, train, etc., an RFID (radio frequency identification) transponder is provided. This RFID transponder, which has a predetermined breaking point, is attached to components to be monitored such that relative movements and/or positional changes of these components lead to a fracture of the RFID transponder at the predetermined breaking point.

The main aspect of the inventive proposed solution is that the RFID transponder with the predetermined breaking point is attached to relevant components to be checked, especially at connections between two or more components. If for example an undesired relative movement and/or positional change of a component, by a connection becoming looser for example, etc. occurs, or on loss of a component (e.g. a nut in a nut and bolt connection, etc.) the RFID transponder loses its function. I.e the RFID transponder at this location of the vehicle or with this component can no longer be detected and a fault/defect on the vehicle can thus be discovered and rectified quickly and at relatively low cost—even at difficult-to-access locations such as in the area of the running gear for example, through which the effort for the maintenance of the vehicle is reduced. By the use of RFID transponders even very small relative movements between components can also already be detected and it is possible to reduce human influences such as for example a human failure rate by emotional-cognitive disposition for example.

Radio frequency identification (RFID) usually involves carrying out an identification with the aid of electromagnetic waves. RFID thus makes possible an automatic detection and/or localization of objects, etc. and thus makes it considerably easier to capture data. An RFID system therefore usually consists of an RFID transponder which is located on or in the respective object, etc. and an RFID reader unit for reading out the RFID transponder in which, inter alia, data for identification is stored.

It is therefore advantageous for at least one RFID reader unit to be provided for a function check of the respective RFID transponder attached e.g. to the vehicle or to the running gear of a vehicle. This at least one reader unit can be attached on the rail side or to the vehicle for ongoing function checking. This enables the vehicle, such as the running gear of a rail vehicle for example, to be continuously examined in a simple and low-cost way for faults and defects. If undesired relative movements and/or positional changes occur in the components being monitored or if a monitored component is lost, the RFID transponder fractures at the predetermined breaking point and thus can no longer be detected and read out by the RFID reader unit.

An RFID transponder design principally provides for an antenna, a permanent memory or microchip, a holder and, with so-called active transponders, a power supply. In such cases data is stored in the memory, which can be transmitted to the RFID reader unit and is used for identification. If the RFID transponder is fractured at the predetermined breaking point, this data can no longer be sent and the defect/fault on the vehicle can be detected in this way. The RFID transponder can obtain the energy for a communication with the RFID reader unit from the field of the RFID reader unit, this transponder is then also referred to as a passive transponder.

The RFID transponder can however also have its own power supply, such as a built-in battery for example, or a connection to an external power network, in order to increase the communication range of the RFID transponder. RFID transponders with their own power supply are then referred to as active transponders. Use of both transponder types (active and passive) is conceivable for the inventive device.

A preferred development of the invention makes provision for each RFID transponder attached to the vehicle to have a unique code, e.g. a number, etc. from which a position (e.g. on the vehicle, on the running gear of the vehicle, etc.) of the respective RFID transponder is able to be obtained. This code is for example stored in the memory of the RFID transponder. In this simple way it can be very easily established at which position a fault/defect, such as for example an undesired relative movement of a component, a positional change, a loosening of a connection, a loss of a component, etc. has occurred. If for example an RFID transponder with a specific code is not detected during a check, it can be concluded that a fault is present at its position. I.e only with non-detectable RFID transponders do—in some cases difficult-to access—locations on the vehicle, such as in the area of the running gear for example, have to be inspected more closely. This saves time and money.

In an advantageous manner the RFID transponder is permanently attached at least to the vehicle component to be monitored.

Thus a fracture at the predetermined breaking point during an undesired relative movement and/or a positional change of the component is facilitated and a defect on the vehicle is thus easier to identify. The RFID transponder can be permanently attached in such cases by attachment means, especially by gluing, welding and/or screws, since such connections are easy to install or to make.

In particular it is recommended that running gear components which have connections by means of connecting elements are monitored. In this way defects, such as loosening of the connections and thus safety-relevant movements and/or positional changes of components, can be identified without great effort and quickly. The RFID transponder can be permanently attached in such cases to a first component for example and is then either connected to a second component which has a connection to the first component or to any connection means that might be used. This also makes it possible to detect relatively small relative movements between the components at an early stage.

Preferably components are monitored for which the connection of one or more components is made by means of a screw connection. In this way, without any great outlay in time, even relatively small loosenings in screw connections, such as occur for example through vibrations during the use of the vehicle (e.g. rail vehicle) or the running gear, can be identified. With the inventive device for example loosened or missing screws and/or nuts can be detected which can barely be seen for example because of their position (e.g. difficult to access) or because of the slight loosening.

BRIEF DESCRIPTION OF THE DRAWINGS

The invention is explained below by way of examples which refer to the enclosed FIGURE.

FIG. 1 shows a schematic diagram of an example of an inventive device for automatic detection of relative movements and positional changes in a vehicle using a component connection in the area of the vehicle running gear as an example.

SUMMARY OF THE INVENTION

FIG. 1 shows a schematic diagram of an example of a first component 1 and a second component 2 of a vehicle, especially of train running gear or running gear of a rail vehicle. The first component 1 in this case is connected to the second component 2 by means of a third component 3 (e.g. a screw 3). This typical screw connection comprises in this case, in addition to a means of connection or a screw 3 and a washer, also a nut 4 for better fixing of this connection.

For detection of undesired relative movements between the first component 1 and the second component 2 or in order to be able to establish positional changes and/or a loosening of the screw connection or of the screw 3, an RFID transponder 5 is attached to the first component 1. The RFID transponder has a predetermined breaking point 6, by which the RFID transponder 5 is divided into a first part 7 and a second part 8. The first part 7 of the RFID transponder 5 in this case is attached to the first component with the aid of attachment means 11. Screws, adhesive, a welded connection, etc. for example can be used as the attachment means 11. The second part of the RFID transponder 5 is connected to the screw connection or to the nut 4. With other component connections in vehicles it is also conceivable for the second part of the RFID transponder 5 to be attached for example to the second component 2, to the screw 3, etc., in order to detect relative movements and/or positional changes, loosenings of the screw 3, etc. which might occur.

Furthermore the RFID transponder comprises at least one shock protection facility/holder, an antenna 9 for data transmission to an RFID reader unit, which in order to simplify the layout of FIG. 1, is not shown, and a memory element or a microchip 10, in which data for identification of the RFID transponder 5 is stored. The antenna 9 of the RFID transponder 5 is disposed in such cases in the holder material such that it is routed via the predetermined breaking point 6 and thus runs from the first part 7 of the RFID transponder into the second part 8.

Therefore the antenna 9 is destroyed during a fracture of the RFID transponder 5 at the predetermined breaking point 6. The RFID transponder 5 thus loses its function and can no longer be detected by the RFID reader unit.

If for example, through stresses on the running gear, vehicle, etc. in the example the nut 4 is now loosened or comes off and thus undesired relative movement between first component 1 and second component 2 or positional changes of the first component 2 or the screw 3 become possible, the RFID transponder 5 fractures as a result of this relative movement or positional change at the predetermined breaking point 6. As a result of the course of the antenna 9, the antenna 9 is destroyed when the RFID transponder 5 fractures and the RFID transponder 5 can no longer be detected or read by the RFID reader unit.

As a result of the missing data of the RFID transponder 5, the defect on the vehicle or running gear—e.g. a loose screw connection, loose screw 3, etc.—is detected. Since the RFID transponders 5 attached to the vehicle have a code from which their position on the vehicle can be uniquely derived, the position of the defect can be determined in a simple manner as a result of a lack of response from a broken RFID transponder 5.

A repair can then be explicitly carried out at this position of the vehicle and if necessary the broken RFID transponder 5 replaced by new one, so that a new defect at this position is able to be identified in a simple manner.

The reader unit for function checking of the RFID transponder 5 can for example be used during maintenance or repair of vehicles. It is however also possible, for an ongoing checking or monitoring of the vehicles, especially in the field of rail vehicles and/or railways, to fit RFID reader units to the track side, which then read out the RFID transponders 5 on passing vehicles or their running gear for example. If one or more RFID transponders 5 are no longer detected, then for example a rapid check, etc. of the respective vehicle can be instigated.

LIST OF REFERENCE CHARACTERS

1 First component
2 Second component
3 Third component—screw
4 Nut
5 RFID transponder with shock protection/holder
6 Predetermined break point
7 First part of the RFID transponder
8 Second part of the RFID transponder
9 Antenna
10 Memory element
11 Attachment means

The invention claimed is:

1. A device for detecting relative movements in a component of a vehicle, comprising:
   an RFID transponder, which is formed as a unitary structure and which has a first part and a second part as well as a predetermined breaking point between the first part and the second part,
   wherein the RFID transponder is attached such that relative movements and/or positional changes of the component lead to a permanent fracture of the RFID transponder at the predetermined breaking point and to a destruction of the RFID transponder.

2. The device as claimed in claim 1, wherein at least one RFID reader unit is provided for a function check of the respective RFID transponder.

3. The device as claimed in claim 1, wherein the RFID transponder has a unique code, from which a position of the RFID transponder is able to be derived.

4. The device as claimed in claim 1, wherein the first part of the RFID transponder is permanently attached at least to the component to be monitored.

5. The device as claimed in claim 4, wherein the first part of the RFID transponder is attached by an attachment means.

6. The device as claimed in claim 4, wherein the first part of the RFID transponder is attached by the attachment means by gluing, and/or welding and/or screwing.

7. The device as claimed in claim 1, wherein the vehicle is a rail vehicle or a train.

* * * * *